(12) United States Patent
Goldenberg et al.

(10) Patent No.: US 7,515,753 B2
(45) Date of Patent: Apr. 7, 2009

(54) PHASE EXTRACTION IN OPTICAL PROCESSING

(75) Inventors: Efraim Goldenberg, Ashdod (IL);
David Mendlovic, Petach-Tikva (IL);
Emanuel Marom, Tel-Aviv (IL);
Leonard Bergstein, Teaneck, NJ (US);
Aviram Sariel, Ramot-Hashavim (IL)

(73) Assignee: Lenslet Labs Ltd., Ramot-HaShavim (IL)

( * ) Notice: Subject to any disclaimer, the term of this patent is extended or adjusted under 35 U.S.C. 154(b) by 42 days.

(21) Appl. No.: 11/470,800

(22) Filed: Sep. 7, 2006

(65) Prior Publication Data

US 2007/0003145 A1 Jan. 4, 2007

Related U.S. Application Data

(63) Continuation of application No. 09/979,182, filed as application No. PCT/IL00/00284 on May 19, 2000, now abandoned, which is a continuation-in-part of application No. 09/926,547, filed as application No. PCT/IL99/00479 on Sep. 5, 1999, now Pat. No. 7,194,139.

(30) Foreign Application Priority Data

May 19, 1999 (IL) .................................. 130038
Jul. 25, 1999 (IL) .................................. 131094

(51) Int. Cl.
*G06K 9/66* (2006.01)
(52) U.S. Cl. ..................................... 382/191
(58) Field of Classification Search ................. 382/211, 382/191
See application file for complete search history.

(56) References Cited

U.S. PATENT DOCUMENTS 3,872,293 A 3/1975 Green (Continued)

FOREIGN PATENT DOCUMENTS

EP 1190286 3/2002

(Continued)

OTHER PUBLICATIONS

Cheng et al. "Optical Cosine Transform Using Phase Conjugation Technique", Proceedings of the 3rd International Conference on Holographic Systems, Components and Applications, Organized by Electronics Division of the Institution of Electrical Engineers, p. 114-117, 1991.

(Continued)

*Primary Examiner*—Matthew C Bella
*Assistant Examiner*—Dennis Rosario

(57) ABSTRACT

A method of optical data processing, comprising:
providing a first data set to be optically transformed using a transform;
combining a reference data set with said first data set to generate coherent light, encoding a combined data set;
optically and coherently transforming said light that encodes the combined data set, into coherent light that encodes a transformed combined data set;
obtaining a transformed reference data set by determining the effect said optical transform has on light encoding said reference data set; and
extracting a second data set that represents a transform of said first data set, from an intensity portion of light encoding said transformed combined data set, using said transformed reference data set to extract a phase of at least one element of said second data set.

20 Claims, 6 Drawing Sheets

U.S. PATENT DOCUMENTS

| | | | |
|---|---|---|---|
| 3,891,968 | A | 6/1975 | McMahon |
| 4,603,398 | A | 7/1986 | Bocker et al. |
| 4,607,344 | A | 8/1986 | Athale et al. |
| 4,651,297 | A | 3/1987 | Schlunt |
| 4,697,247 | A | 9/1987 | Grinberg et al. |
| 4,703,361 | A | 10/1987 | Girard |
| 4,809,204 | A | 2/1989 | Dagenais et al. |
| 4,832,447 | A | 5/1989 | Javidi |
| 4,860,253 | A | 8/1989 | Owechko et al. |
| 4,949,389 | A | 8/1990 | Allebach et al. |
| 4,986,640 | A | 1/1991 | Athale |
| 5,005,954 | A | 4/1991 | Liu |
| 5,099,448 | A | 3/1992 | Myers et al. |
| 5,119,443 | A | 6/1992 | Javidi et al. |
| 5,166,508 | A | 11/1992 | Davis et al. |
| 5,258,934 | A | 11/1993 | Agranat et al. |
| 5,297,068 | A | 3/1994 | Guilfoyle et al. |
| 5,317,651 | A | 5/1994 | Refregier et al. |
| 5,321,639 | A | 6/1994 | Krishnamoorthy et al. |
| 5,333,117 | A | 7/1994 | Ha et al. |
| 5,384,573 | A | 1/1995 | Turpin |
| 5,394,257 | A | 2/1995 | Horan et al. |
| 5,420,826 | A | 5/1995 | Abramovitz |
| 5,455,622 | A | 10/1995 | Compton |
| 5,485,312 | A | 1/1996 | Horner et al. |
| 5,497,253 | A | 3/1996 | Stoll et al. |
| 5,537,492 | A * | 7/1996 | Nakajima et al. ............ 382/232 |
| 5,659,637 | A | 8/1997 | Bagley, Jr. et al. |
| 5,694,488 | A | 12/1997 | Hartmann |
| 5,784,309 | A | 7/1998 | Budil |
| 5,841,907 | A | 11/1998 | Javidi et al. |
| 5,867,386 | A | 2/1999 | Hoffberg et al. |
| 6,178,020 | B1 | 1/2001 | Schultz et al. |
| 6,239,909 | B1 | 5/2001 | Hayashi et al. |
| 6,529,614 | B1 | 3/2003 | Chao et al. |
| 6,535,629 | B2 | 3/2003 | McCormick et al. |
| 6,744,909 | B1 * | 6/2004 | Kostrzewski et al. ........ 382/115 |
| 7,012,749 | B1 | 3/2006 | Mendlovic et al. |
| 7,119,941 | B1 | 10/2006 | Shabtay et al. |
| 7,194,139 | B1 | 3/2007 | Sariel et al. |
| 2005/0018295 | A1 | 1/2005 | Mendlovic et al. |
| 2005/0031221 | A1 | 2/2005 | Ludwig |
| 2005/0149598 | A1 | 7/2005 | Mendlovic et al. |

FOREIGN PATENT DOCUMENTS

| | | |
|---|---|---|
| JP | 05-333398 | 12/1993 |
| WO | WO 00/72104 | 11/2000 |
| WO | WO 00/72105 | 11/2000 |
| WO | WO 00/72107 | 11/2000 |
| WO | WO 00/72108 | 11/2000 |

OTHER PUBLICATIONS

Eckert et al "Compact Planar-Integrated Optical Correlator for Spatially Incoherent Signals", Applied Optics, 39(5): 759-765, 2000.
Juvells et al. "Optical Pattern Recognition in Motion Acquired Scenes Using A Binary Joint Transform Correlation", Journal of Modern Optics, 44(2): 313-326, 1997. Abstract, Paragraph '0005!
Roblin "Sur la Restitution du Signe de la Phase en Interferometrie", Optics Communications, 15(3): 379-383, 1975. French Only! Abstract, Paragraph '0002!
Wong et al. "Optical Cosine Transform Using Microlens Array and Phase-Conjugate Mirror", Japanese Journal of Applied Physics, 31: 1672-1676, 1992.
Ando et al "Optical Computing Using Optical Flip Flops in Fourier Processors: Use in Matrix Multiplication and Discrete Linear Transforms", Applied Optics, 28(24), 5363-5373, 1989.
Arrathoon "Historical Perspectives: Optical Crossbars and Optical Computing", SPIE, Digital Optical Computing, SPIE, 752: 2-11, 1987.
Arrathoon et al "Shadow Casting for Multiple-Valued Associate Logic", Optical Engineering, 25(1): 29-37, 1986.
Athale et al "High Accuracy Matrix Multiplication With Outer Product Optical Processor", Applied Optics, 22(3): 368-371, 1983.
Breault Research Organization "Physical Optics in ASAP", ASP Procedural Note, Breault Research Organization Inc., Optical Engineering Software and Services, p. 1-10, 2000.
Casasent "Acoustoopic Transducers in Iterative Optical Vector-Matrix Processors", Applied Optics, 21(10): 1859-1865, 1982.
Casasent et al "Frequency-Multiplexed and Pipelined Iterative Optical Systolic Array Proceesors", Applied Optics, 22(1): 115-124, 1983.
Caufield et al "Optical Implementation of Systolic Array Processing", Optics Communications, 40(2): 86-90, 1981.
Caufield et al. "Optical Computing: The Coming Revolution in Optical Signal Processing", Laser Focus/Electro-Optics, Circle No. 75, p. 100-106, 108, 110, 1983.
Caufield et al. "Efficient Matrix Partitioning for Optical Computing", Optics Communications, 51(4): 213-216, 1984.
Collings et al "Characterization of Optically Addressed SLMs for Recurrent Optical Neural Networks", International Journal of Optical Computing, 2(2): 97-107, 1991.
Dammann et al "High Efficiency In-Line Multiple Imaging by Means of Multiple Phase Holograms", Optics Communications, 3(5): 312-315, 1971.
Decusatis et al "Hybrid Optical Implementation of Discrete Wavelet Transforms: A Tutorial", Optics & Laser Technology, 28(2): 51-58, 1996.
Eckert et al "Design and Fabrication of A Compact Planar—Integrated Optical Correlator", Conference of the Proceedings of the IEEE Lasers and Electro-Opitics Societey's 10th Annual Meeting, LEO'97, 1(10-13): 134-135, 1997.
Efron "Spatial Light Modulators and Applications for Optical Information Processing", Real-Time Signal Processing for Industrial Applications, SPIE, 960: 180-203; 1988.
Eichmann et al "Optical Binary Coded Ternary Arithmetic and Logic", Applied Optics, 25(18): 3113-3121, 1986.
Ellett et al "Throughput Analysis of Digital Partitioning With Error-Correcting Codes for Optical Matrix-Vector Processors", Applied Optics, 34(29): 6744 -6751, 1995.
Feng et al "Multiobject Recognition in A Multichannel Joint-Transform Correlator", Optics Letters, 20(1): 82-84, 1995.
Gary "Matrix-Vector Multiplication Using Digital Partitioning for More Accurate Optical Computing", Applied Optics, 31(29): 6205-6211, 1992.
Glaser "Noncoherent Parallel Optical Processor for Discrete Two-Dimensional Linear Transformations", Optics Letters, 5(10): 449-451, 1980.
Goodman "Analog Optical Information Processing", Introduction to Fourier Optics, 2nd Ed.(Chap.8): 217-294, 1996.
Goutzoulis "Systolic Time-Integrating Acoustoopic Binary Processor", Applied Optics, 23(22): 4095-4099, 1984.
Hu et al. "Optimum Matching of Wavefront Sensor and Wavefront Corrector", Proceedings of the SPIE, 2534: 318-326, 1995. Paragraph [0001].
Huang et al "Fast Parallel Complex Discrete Fourier Transforms Using A Multichannel Optical Correlator" Optics Communications, 68(6): 408-411, 1988. p. 409, r-h Col., Line 11—p. 410, 1-h Col., Last Line, Figs.2-4.
Hwang et al "High Radix Symbolic Substitution and Superposition Techniques for Optical Matrix Algebraic Computations", Optical Engineering, SPIE, 31(11): 2422-2433, 1992. Abstract. Abstract.
Hwang et al "High-Radix Symbolic Substitution and Superposition Techniques for Optical Matrix Algebraic Computations", Optics Communications, 71(1/2): 39-45, 1989.
IBM Corporation IBM Technical Disclosure Bulletin, IBM Corp., New York, US, 18(7): 2159-2161, 1975.
Inbar et al "Modified Joint Transform Correlator Binarized by Error Diffusion. II. Spatially Variant Range Limit", Applied Optics, 33(20): 4444-4451, 1994. p. 4445, 1-h Col., Lines 26-33, Fig.1.
Israel et al "Asynchronous Integrated Optical Multiply, Accumulate With Sideway Summer", Applied Optics, 25(14): 2284-2887, 1986.

Iwaki et al "Optical Pattern Recognition With LAPS-SLM (II) / Feedback Joint Transform Correlator Using LAPS-SLM", Computer & Optically Formed Holographic Optics, Proceedings of the SPIE, 1211: 284-295, 1990.

Jain "Fundamentals of Digital Image Processing", Prentice-Hall, Chap.4(4.5-4.6): 99-101, 1989.

Kornreich et al. "DEFT: Direct Electronic Fourier Transforms of Optical Images", Proceedings of the IEEE, 62(8): 1073-1087, 1974.

Li et al "Coherent Optical Processing of Gabor and Wavelet Expansions of One and Two-Dimensional Signals", Optical Engineering, US, Sociaty of Photo-Optical Instrumentation Engineers, 31(9): 1865-1885, 1992. Abstract, Paragraph '0003!

Louri et al "A Bit-Plane Architecture for Optical Computing With Two-Dimensional Symbolic Substitution", The 15th Annual International Symposium on Computer Architecture, May 30-Jun. 2, 1988, Hawaii, IEEE Computer Society Press, p. 18-27, 1988.

McAulay "Optical Crossbar Interconnectred Digital Signal Processor with Basic Algorithms", Optical Engineering, 25(1), 82-90, 1986.

O'Brien et al "A Holographically Routed Optical Crossbar: Theory and Simulation", Optical computing and Processing, 1(3), 233-243, 1991.

Ouziele et al "Two-Dimensional Wavelet Processor", Applied Optics,35(29): 5839-5846, 1996.

Psaltis et al "High Accuracy Computation With Linear Analog Optical Systems: A Critical Study", Applied Optics, 25(18): 3071-3077, 1986.

Reinhorn et al. "Compact Optical Crossbar Switch", Applied Optics, 36(5): 1039-1044, 1997.

Ross et al "Two-Dimensional Magneto-Optic Spatial Light Modulator for Signal Processing", Real Time Signal Processing V, SPIE, 341: 191-198, 1982.

Schmid et al "Microlens Array Processor With Programmable Weight Mask and Direct Optical Input", Part of the SPIE Conference on Optical Pattern Recognition X, Orlando, FL, SPIE, 3715: 175-174, 1999.

Shigeru et al. "Optical Computing Using Optical Flip-Flops in Fourier Processors: Use in Matrix Multiplication and Discrete Linear Transforms", Applied Optics, 28(24): 5363-5373, 1989.

Shin et al "Optical Neural Network Using Fractional Fourier Transform, Log-Likelihood, and Parallelism", Optics Communications, 153(4-6): 218-222, 1998. Abstract.

Soffer et al. "Variable Grating Mode Liquid Crystal Device for Optical Processing", Devices and Systems for Optical Signal Processing, SPIE, 218: 81-87, 1980.

Takimoto et al "An Optical Neuron Device Capable of Optical Parallel Operations and All-Optical Neural Networks", Electronics and Communications in Japan, Part II: Electronics, 76(10): 1-9, 1993.

Teijido et al. "Design Methods for Illumination Light Pipes", Illumination and Source Engineering, Proceeding of SPIE, 3428: 34-44, 1998.

Teijido et al. "Design of A Non-Conventional Illumination System Using A Scattering Light Pipe", Proceedings Europto Series, Design and Engineering of Optical Systems, SPIE, 2774: 747-756, 1996.

Teijido et al. "Illumination Light Pipe Using Micro-Optics as Diffuser", Proceedings Europto Series, Holographic and Diffravtive Techniques, SPIE, 2951: 146-155, 1996.

Wu et al "A Fast Algorithm for Reduced-Complexity Programmable DSP Implementation of the IFFT/FFT in DMT Systems", Globecom 1998, The Bridge to Global Integration, IEEE, 2: 833-838, 1998.

Yao et al "New Optoelectronic Morphological Scheme for Multiple-Object Recognition", Optical Engineering, SPIE, 33(11): 3727-3732, 1994. Abstract.

Yoshida et al "Optical Computing Techniques for Image/Video Compression", Proceedings of the IEEE, 82(6): 948-954, 1994.

Yu et al "Digital Optical Architectures for Multiple Matrix Multiplication", Optics Communications, 71(1/2): 39-45, 1989.

Zhang et al. "Incoherent Optical Implementation of 2-D Complex Discrete Fourier Transform and Equivalent 4-F System", Optics Communications, 74(5): 295-300, 1990.

Zhongbing et al "New Optoelectronic Morphological Scheme for Multiple-Object Recognition", Optical Engineering, 33(11): 3727-3732, 1994.

* cited by examiner

PHASE EXTRACTION IN OPTICAL PROCESSING

RELATED APPLICATIONS

This application is a continuation of U.S. application Ser. No. 09/979,182 filed Feb. 25, 2002, now abandoned which is a U.S. national filing of PCT Application No. PCT/IL00/00284, filed May 19, 2000. This application is also a continuation in part of PCT application No. PCT/IL99/00479, filed Sep. 5, 1999, now U.S. application Ser. No. 09/926,547, filed on Mar. 5, 2002 now U.S. Pat. No. 7,194,139, the disclosures of which are incorporated herein by reference.

FIELD OF THE INVENTION

The invention relates to optical methods and apparatus for performing computations and in particular to transforming a first data set into a second data set by a linear transformation and determining the phase of data elements in the second data set.

BACKGROUND OF THE INVENTION

Optical data processing can often be used to process data more rapidly and efficiently than conventional computational methods. In particular, optical methods can be used to perform linear transformations of data sets rapidly and efficiently.

For example, it is well known that converging lenses can be used to substantially "instantaneously" transform a first image into a second image that is a Fourier transform of the first image. It is to be noted that the Fourier transform is a relationship between the complex amplitudes of light in the images and not between the intensities of light in the images. The same is generally true with respect to other transformations of images, the transformation is a transformation of complex amplitudes of light and not intensities of light. It is therefore to be understood that when a second image is said to be a Fourier, or other, transform of a first image, what is meant is that the spatial pattern of the complex amplitude of light in the second image is the Fourier, or other, transform of the spatial pattern of the complex amplitude of light in the first image.

If the first image is coded with data, the second image is coded with data that is the Fourier transform of the data in the first image. A suitable optical processor can therefore provide substantial advantages in comparison to a conventional data processor when a spectral analysis of a data set is desired. However, a Fourier transform of a data set in general involves complex numbers, even if the data set comprises only real numbers. Therefore, in order to properly detect an "optical" Fourier transform of a data set, phase as well as intensity of light of an image representing the Fourier transform must be detected. While this can be accomplished, most light detectors are generally sensitive only to light intensity and are not responsive to phase.

It is therefore generally more convenient to determine values for data represented by an image from only the intensity of light in the image. Consequently, it is usually advantageous to process data optically using methods that generate only real numbers from the data.

For example, it is often preferable to optically process data coded in an image in accordance with a cosine transform to perform a spectral analysis of the data rather than a Fourier transform. The cosine transform of a real data set generates real values. However, whereas a cosine transform of a real data set does not generate complex numbers it does, usually, generate both positive and negative numbers. Therefore, while most of the information in an optical cosine transform of an image can be acquired from measurements of intensity of light in the image, sign information is not preserved in the intensity measurements. As a result, an optical processor that transforms an input image into an output image that represents the cosine transform of the input image requires a means for determining which of the numbers represented by the output image are positive and which are negative.

K. W. Wong et al, in an article entitled "Optical cosine transform using microlens array and phase-conjugate mirror", Jpn J. Appl. Phys. vol. 31, 1672-1676, the disclosure of which is incorporated herein by reference, describes a method of distinguishing positive and negative data in a cosine transform of an image.

The problem of distinguishing the sign of numbers represented by an image when only the intensity of light in the image is measured is of course not limited to the case of data optically generated by a cosine transform. The problem affects all real linear transforms, such as for example the sine and discrete sine transforms and the Hartley transform, when the transforms are executed optically and only their intensities are sensed, if they generate both positive and negative values from a real data set.

SUMMARY OF THE INVENTION

An aspect of some embodiments of the present invention relates to providing a method for determining the sign of data encoded in an output image of a linear optical processor using measurements of intensity of light in the output image, hereinafter referred to as a "data output image". The data output image is assumed to be generated by the processor responsive to an input image, a "data input image", encoded with input data that is real. The input data is either all positive or all negative. For clarity of presentation it is assumed that the input data is all positive.

According to an aspect of some embodiments of the present invention, a reference input image is defined for the optical processor. Magnitude and phase of amplitude of a "reference" output image generated by the processor responsive to the input reference image are used to determine the sign of data represented by the data output image.

The operation of a linear optical processor may be described by the equation $F(u,v)=O(u,v:x,y)f(x,y)$. In the equation $f(x,y)$ is a complex amplitude of light in an input image, i.e. a data input image, that represents input data, which data input image is located on an input plane of the processor, and x and y are coordinates of the input plane. Similarly, $F(u,v)$ is a complex amplitude of light in a data output image that the processor generates responsive to $f(x,y)$. The data output image is located on an output plane of the processor having position coordinates u and v corresponding respectively to position coordinates x and y of the input plane. Intensity of light in the data input image is equal to $|f(x,y)|^2$ and intensity of light in the data output image is equal to $|F(u,v)|^2$.

$O(u,v:x,y)$ represents any continuous or discrete linear operator that transforms a first real data set into a second real data set. $O(u,v:x,y)$ may for example represent the continuous or discrete sine or cosine transform or the Hartley transform. For continuous linear transformations u, v, x and y are continuous and multiplication in the equation representing operation of the processor represents integration over the x, y coordinates. For discrete linear operators u, v, x, and y are discrete coordinates and multiplication represents summation over the x, y coordinates.

Since, in accordance with embodiments of the present invention, the input data is assumed to be real and positive, the phase of f(x,y) is constant and input data is represented by the magnitude of f(x,y). F(u,v) also represents a real data set. However F(u,v) may have both positive and negative data. Data having positive values are represented by values of F(u,v) having a same first phase. Data having negative values are represented by values of F(u,v) having a same second phase 180° different from the first phase.

Let the reference input image and its corresponding reference output image be represented by r(x,y) and R(u,v). Both r(x,y) R(u,v), and intensity of light in the reference output image $|R(u,v)|^2$ are known. It is to be noted that it is possible to define and synthesize any predefined reference function r(x,y) and use it for sign reconstruction in accordance with embodiments of the present invention. Whereas descriptions of the present invention assume that r(x,y) is real the invention is not limited to the reference image being real. Magnitude and phase of R(u,v) are known from the transform that the optical processor executes and can be checked experimentally using methods known in the art. Preferably, r(x,y) is real. Therefore R(u,v) preferably corresponds to a real data set. In some embodiments of the present invention R(u,v) is a real data set comprising values all of which have a same sign. In some embodiments of the present invention the data set comprises one of or a combination of positive, negative and complex values.

In accordance with an embodiment of the present invention, to determine both the magnitude and sign of F(u,v) the intensity of the data output image $|F(u,v|^2$ is measured. In addition, in accordance with an embodiment of the present invention, a combined input image c(x,y)=f(x,y)+r(x,y) are processed by the processor to provide a combined output image C(u,v)=F(u,v)+R(u,v). Intensity of light in the combined output image, which is equal to $|C(u,v)|^2=|F(u,v)|^2+|R(u,v)|^2+2F(u,v)R(u,v)$, is measured. Since $|F(u,v)|^2$, $|R(u,v)|^2$ and R(u,v) are known, the sign of F(u,v) can be determined from the "interference" term 2F(u,v)R(u,v).

It is to be noted that not only sign of F(u,v) can be determined from $|C(u,v)|^2$, $|F(u,v)|^2$, $|R(u,v)|^2$ and R(u,v). In general, $(|C(u,v)|^2-|F(u,v)|^2-|R(u,v)|^2)/2R(u,v)$ provides a magnitude and a phase for F(u,v). In some cases the phase is known to within an ambiguity, for example, a symmetry ambiguity or a 180°. In some embodiments of the invention the ambiguity is removed and the phase extracted by determining a combined image C(u,v) for two or more different reference images r(x,y). The phase can be extracted for example by solving for F(u,v) using the two combined and reference images.

In some embodiments of the present invention the reference image is chosen so that $|R(u,v)| \geq |F(u,v)|$ for all values of u and v for which R(u,v) and F(u,v) have opposite signs. For these embodiments of the present invention only the combined input image c(x,y)=f(x,y)+r(x,y) is processed by the processor to determine both the magnitude and sign of F(u,v). If the intensity of light in the combined image minus the intensity light in the reference image at a point (u,v) in the output plane of the processor is greater than zero, the signs F(u,v) and R(u,v) are the same at the point. If on the other hand the difference is less than zero, the signs of F(u,v) and R(u,v) are opposite. Since the sign of R(u,v) is known, the sign of F(u,v) is known. The magnitude of F(u,v) at the point can be determined from the intensity $|C(u,v)|^2$ and the known magnitude and sign of R(u,v) by solving a quadratic equation.

An aspect of some embodiments of the present invention relates to providing an improved method for generating a cosine transform of an "input" image using an optical processor that generates a Fourier transformed output image from an input image.

In accordance with an embodiment of the present invention, a first Fourier image that is a Fourier transform of the input image is generated by the optical processor and the intensity of the Fourier image measured and stored. A second Fourier image is generated by the optical processor from the input image plus a known first reference image and the intensity of the second Fourier image is measured and stored. The input image is parity transformed to generate a second input image, referred to as a "parity image". A third Fourier image, which is a Fourier transform of the parity image is generated and its intensity measured and stored. A fourth Fourier image is generated which is a Fourier transform of the parity image plus a known second reference image. The intensities of the four Fourier images and the amplitudes of the known reference images are used to determine the cosine transform of the input image. In some embodiments of the present invention the first and second reference images are the same.

There is thus provided in accordance with an exemplary embodiment of the invention, a method of optical data processing, comprising:

providing a first data set to be optically transformed using a transform;

combining a reference data set with said first data set to generate a combined data set;

optically transforming said combined data set into a transformed combined data set; and extracting a second data set that represents a transform of said first data set, from an amplitude portion of said transformed combined data set, using said reference image to extract a phase of at least one element of said second data set. Optionally, said transformed combined data set is detected using a power detector. Alternatively or additionally, said transformed combined data set is encoded using incoherent light.

In an exemplary embodiment of the invention, said transformed combined data set is a discrete data set. Alternatively or additionally, said first data set comprises a one-dimensional data set. Alternatively, said first data set comprises a two-dimensional data set. Optionally, said first data set comprises an image.

In an exemplary embodiment of the invention, said first data set comprises at least one positive value. Alternatively or additionally, said first data set comprises at least one negative value. Alternatively or additionally, said first data set comprises at least one complex value.

In an exemplary embodiment of the invention, extracting comprises extracting using electronic processing.

In an exemplary embodiment of the invention, combining a reference data set comprises adding at least one additional value to an existing element of said first data set. Alternatively or additionally, combining a reference data set comprises replacing at least one existing element of said first data set with an element from a second data set. Optionally, the method comprises compensating for an effect of said replaced value after said extraction. Optionally, said compensating comprises compensating using electronic processing.

In an exemplary embodiment of the invention, combining a reference data set comprises adding at least one additional value alongside existing elements of said first data set. Optionally, said at least one additional value is arranged at a corner of a matrix layout of said first data set.

In an exemplary embodiment of the invention, the method comprises selecting said reference image to create a desired offset in said transformed combined data set. Optionally, said selecting takes into account system imperfections. Alternatively or additionally, said offset is substantially uniform. Alternatively, said offset is substantially non-uniform.

In an exemplary embodiment of the invention, said reference data is at least one delta-function. Optionally, said reference data comprises a plurality of delta-functions. Alternatively or additionally, said at least one delta function has an amplitude substantially greater than that of any of the data elements of said first data set.

In an exemplary embodiment of the invention, said at least one delta function has an amplitude substantially greater than that of any of the data elements of said first data set that have a certain phase.

In an exemplary embodiment of the invention, said at least one delta function has an amplitude substantially greater than an amplitude of a component of any of the data elements of said first data set that fit in a certain phase range.

In an exemplary embodiment of the invention, said at least one delta function has an amplitude not greater than that of any of the data elements of said first data set.

Optionally, said amplitudes are measured as amplitudes of transform elements.

In an exemplary embodiment of the invention, combining comprises combining electronically and generating a combined modulated light beam.

Alternatively, combining comprises combining optically. Optionally, combining comprises creating said reference image optically. Optionally, said reference image is created using a refractive optical element. Alternatively, said reference image is created using a dedicated light source.

In an exemplary embodiment of the invention, said transform is a Fourier-derived transform.

In an exemplary embodiment of the invention, said transform is a DCT transform.

In an exemplary embodiment of the invention, extracting a phase comprises extracting only a sign.

BRIEF DESCRIPTION OF FIGURES

A description of exemplary embodiments of the present invention follows. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DETAILED DESCRIPTION OF EMBODIMENTS

In the following discussion an embodiment of the present invention is described in which a real linear transform performed by an optical processor is a cosine transform. The optical processor uses the Fourier transform properties of converging lenses whereby a converging lens transforms an image into its Fourier transform, to generate a cosine transform of an image. The Fourier transform properties of lenses are described in "Introduction to Fourier Optics" by J. W. Goodman, McGraw Hill-Hill Companies, second edition Copyright 1996.

Figure 1:
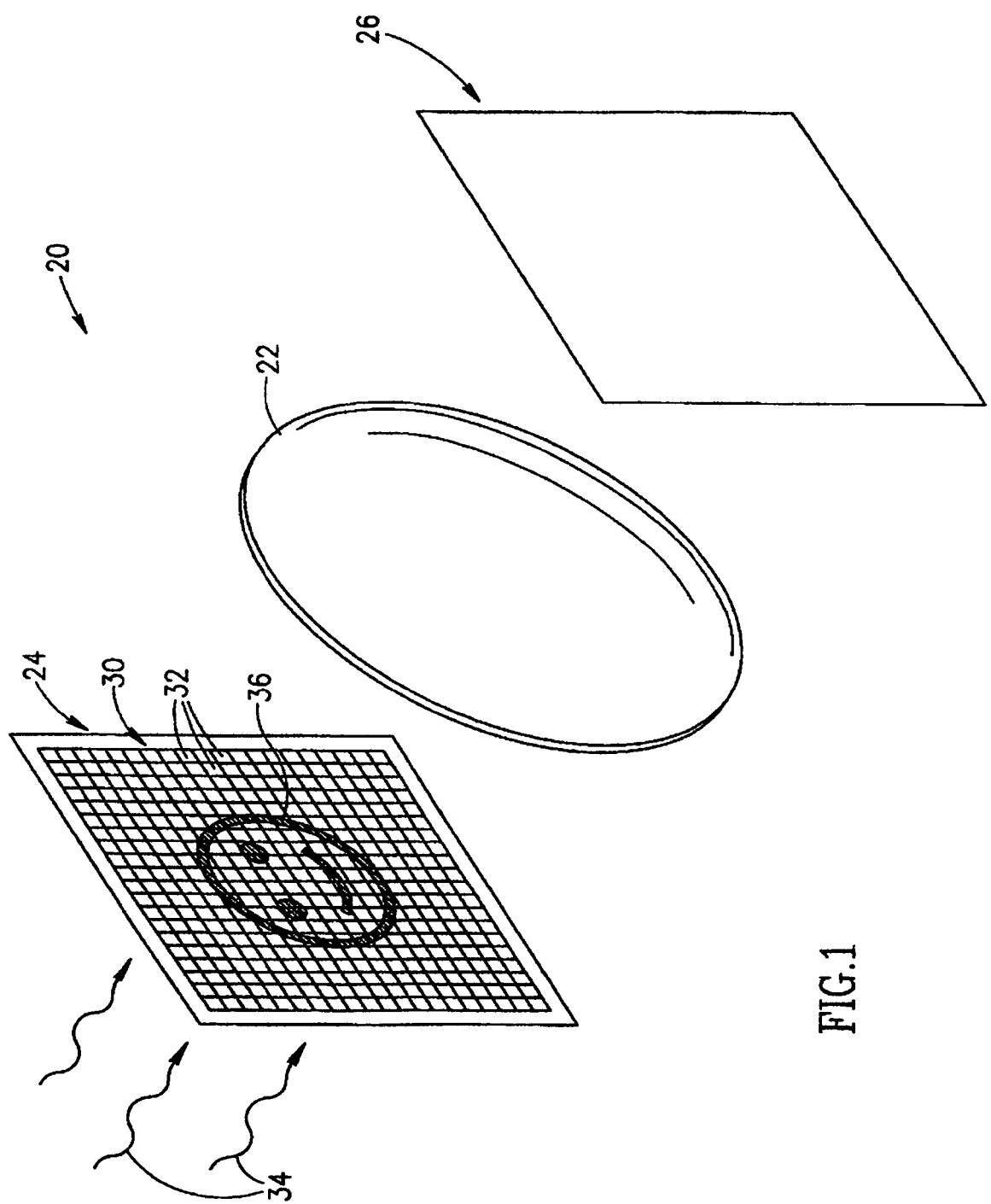
FIG. 1 schematically shows an optical processor generating a Fourier transform of an image according to prior art.

FIG. 1 schematically shows an optical processor 20 that functions to transform images into their Fourier transforms according to prior art. Optical processor 20 comprises a converging lens 22, an input plane 24 and an output plane 26. Input and output planes 24 and 26 are coincident with focal planes of lens 22. It is well known that lens 22 can be used to generate an image on output plane 26 that is a Fourier transform of an image on input plane 24.

For example, assume that a spatial light modulator 30 having pixels 32 is located at input plane 24 and that the spatial light modulator is illuminated with collimated coherent light, represented by wavy arrows 34, from a suitable light source. Pixels 32 have transmittances as a function of position that are proportional to a desired function. Spatial light modulator 30 may, for example, be a photographic transparency, a printed half tone image, a liquid crystal array or a multiple quantum well (MQW) modulator. In FIG. 1, by way of example, the transmittances are determined so that when spatial light modulator 30 is illuminated by light 34 a happy face 36 is formed at input plane 24. Lens 22 will form an image (not shown) on output plane 26 that is the Fourier transform of the happy face 36 on input plane 24.

Given a function $f(x,y)$, the Fourier transform of the function $(1/4)[f(x,y)+f(-x,y)+f(x,-y)+f(-x,-y)]$ is the cosine transform of $f(x,y)$. Each of the functions in the square brackets is a parity transform, or a one dimensional reflection in the x or y axis, of the other functions in the brackets. It is therefore seen that the cosine transform of a two dimensional function can be generated by Fourier transforming all possible parity transforms of the function.

Figure 2:
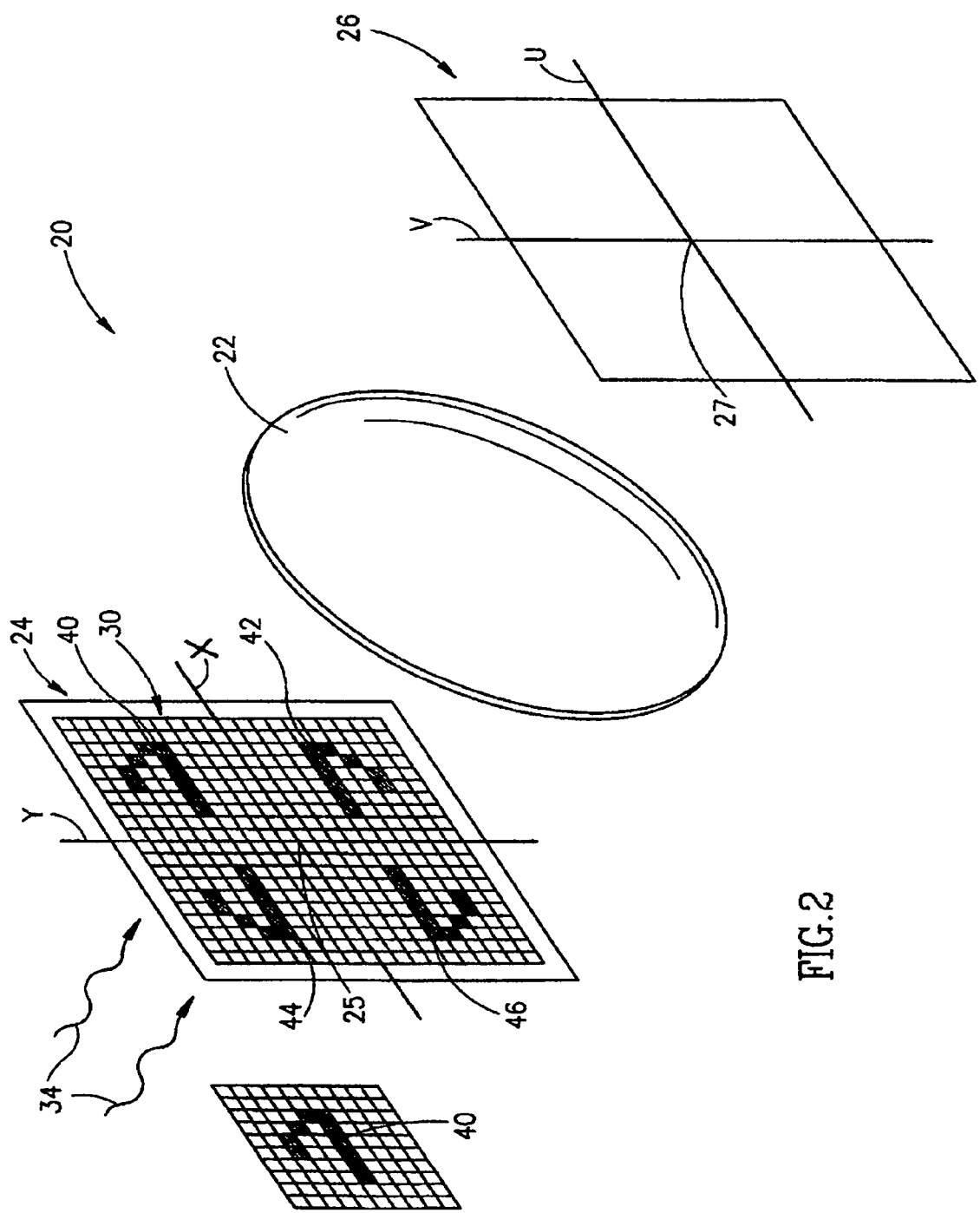
FIG. 2 schematically shows the optical processor shown in FIG. 1 generating a cosine transform of an image in accordance with prior art.

FIG. 2 illustrates how optical processor 20 shown in FIG. 1 can be used to generate a cosine transform of an image 40 in accordance with prior art by Fourier transforming all of the image's parity transforms. Image 40 may, by way of example, be an 8 by 8 block of pixels from an image that is to be compressed according to the JPEG standard using a discrete cosine transform.

Let positions on input plane 24 and spatial light modulator 30 be defined by coordinates along x and y axes indicated on the spatial light modulator and positions on output plane 26 by coordinates along u and v axes indicated on the output plane. Let respective origins 25 and 27 of the x, y coordinates and the u, v coordinates be the intersections of the optic axis (not shown) of lens 22 with input and output planes 24 and 26 respectively.

Image 40 is formed on the upper right quadrant of spatial light modulator 32 and reflections 42 and 44 of image 40 in the x and y axes are respectively formed in the lower right and upper left quadrants of the spatial light modulator. A reflection 46 of image 40 along a 45° diagonal (not shown) to the x axis through the origin is formed in the lower left quadrant of spatial light modulator 30. Let the amplitude of light in image 40 be represented by f(x,y). Let the amplitude of light in the image formed on input plane 24 comprising image 40 and its parity reflections be f'(x,y). Then f'(x,y)=(1/4)[f(x,y)+f(-x,y)+f(x,-y)+f(-x,-y)]. (The decrease in amplitude by 75%, i.e. the factor 1/4, which is not necessary, can of course be achieved by proper control of spatial light modulator 30). If the amplitude of light in an image formed on output plane 26 by lens 22 responsive to f'(x,y) is represented by F(u,v) then F(u,v) is the Fourier transform of f'(x,y). Because of the symmetry of the image on input plane 24, F(u,v) is also the cosine transform of f(x,y). If F.T. represents the operation of the Fourier transform and C.T. represents the operation of the cosine transform then the relationships between F(u,v), f'(x,y) and f(x,y) is expressed by the equation F(u,v)=F.T. {f'(x,y)}=C.T.{f(x,y)}.

It is to be noted that f(x,y) and f'(x,y) represent data that is either all positive or all negative. For clarity of presentation data represented by f(x,y) is assumed to be positive. Further, since the cosine transform performed by optical processor 20 is a real linear transform, as noted above, F(u,v) also represents real data. However, F(u,v) may have both positive and negative data. Therefore, the cosine transform of image f(x,y) cannot be determined from the image on output plane 26 by measuring only the intensity |F(u,v)|².

Figure 3A:
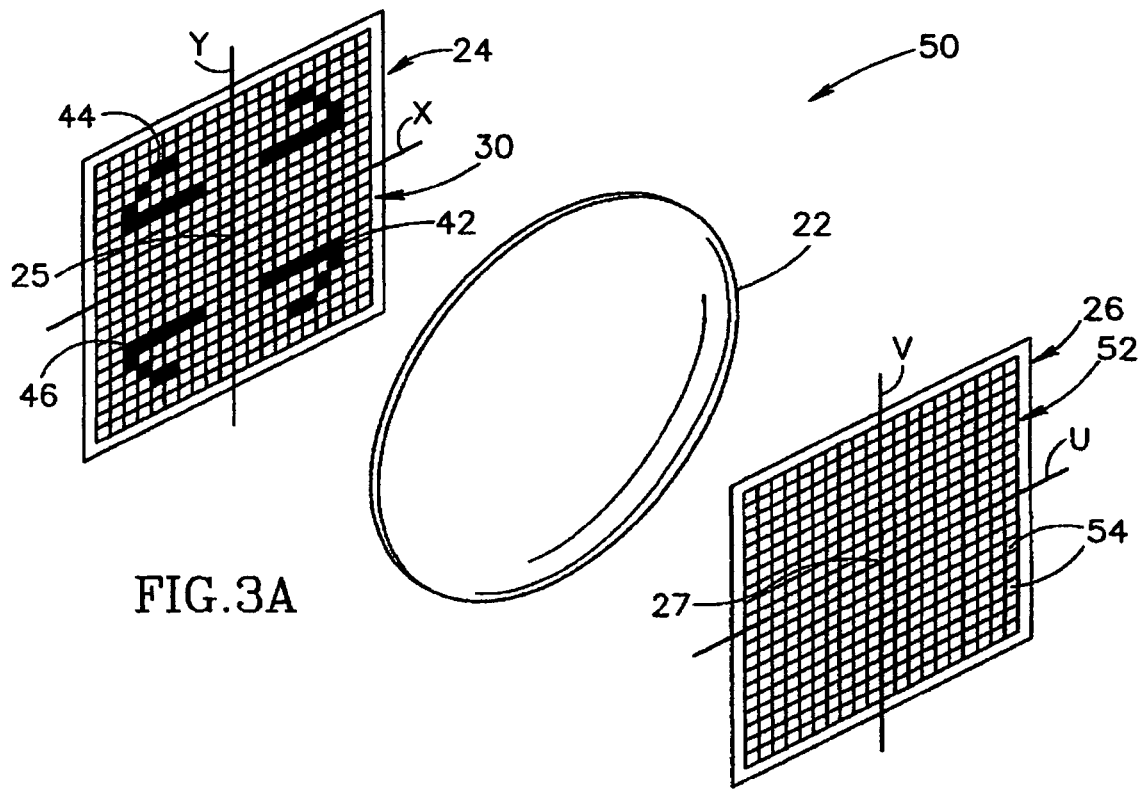
FIGS. 3A and 3B schematically show an optical processor generating a cosine transform of an image in accordance with an embodiment of the present invention.
Figure 3B:
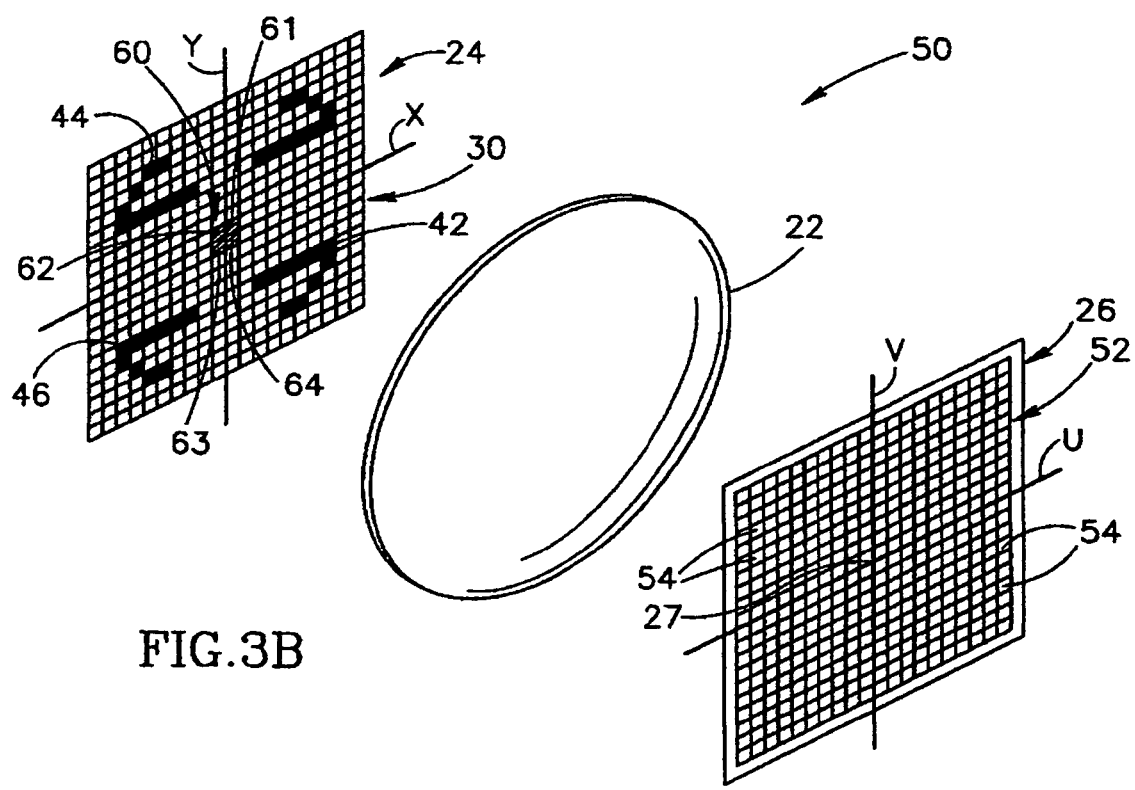

FIGS. 3A and 3B schematically show an optical processor 50 being used to determine the sign and magnitude of the cosine transform F(u,v) of image 40, i.e. f(x,y), in accordance with an embodiment of the present invention.

Optical processor 50 is similar to optical processor 20 and comprises a lens 22, input and output planes 24 and 26. At output plane 26, processor 50 preferably comprises an array 52 of rows and columns of photosensors 54. Each photosensor 54 generates a signal responsive to an intensity of light in an image on output plane 26 at a position determined by the row and column of array 52 in which the photosensor 54 is located and a pitch of array 52. Photosensors 52 sample intensity of light at "discrete" positions (u,v) in output plane 26. Preferably, the number of photosensors 52 is equal to the number of pixels 32 in spatial light modulator 30 and the locations of photosensors 52 are homologous with the locations of pixels 32.

In FIG. 3A, in accordance with an embodiment of the present invention, spatial light modulator 30 generates a first image at input plane 24 comprising image 40 and its parity reflections 42, 44 and 46. The image is the same as the image comprising image 40 and its reflections shown in FIG. 2. Lens 22 forms an image at output plane 26 having amplitude F(u,v). Photosensors 54 generate signals responsive to intensity IF(u,v) of light in the image, where IF=|F(u,v)|², at their respective locations u,v.

In FIG. 3B, in accordance with an embodiment of the present invention, spatial light modulator 30 generates a second "combined" image at input plane 24 that comprises the image shown on the input plane in FIG. 3A with the addition of a reference image 60 having a known amplitude r(x,y). Preferably r(x,y) is chosen so that its Fourier transform is real, i.e. it has a symmetry with respect to the origin of axes x and y which results in its Fourier transform being real. By way of example, in FIG. 3B, reference image 60 is formed by controlling central pixels 61, 62, 63 and 64 located at the origin of coordinates of input plane 24 to transmit light and appear bright.

If c(x,y)=(f'(x,y)+r(x,y)) then lens 22 forms an image (not shown) on output plane 26 that is the Fourier transform of c(x,y) and photosensors 54 generate signals responsive to intensity, IC(u,v), of light in the image. If C(u,v) represents the Fourier transform of c(x,y), then the amplitude of light in the image is C(u,v) and IC(u,v)=|C(u,v)|².

In accordance with some embodiments of the present invention IF(u,v), IC(u,v) and the known Fourier transform of r(x,y) are used to determine the magnitude and sign of F(u,v) and thereby the cosine transform of f(x,y).

C(u,v)=F.T.{c(x,y)}=F.T.{f'(x,y)+r(x,y)}=F.T.{f'(x,y)}+F.T.{r(x,y)}=F(u,v)+R(u,v), where R(u,v) is the known and/or measured Fourier transform of r(x,y). Therefore, IC(u,v)=[|F(u,v)|²+|R(u,v)|²+2F(u,v)R(u,v)]=IF(u,v)+IR(u,v)+2F(u,v)R(u,v), where IR(u,v)=|R(u,v)|². IR(u,v) can be calculated from the known Fourier transform of r(x,y) or measured experimentally. In some embodiments of the present invention the sign and magnitude of F(u,v) are determined from the equation F(u,v)=[IC(u,v)−IF(u,v)−IR(u,v)]/2R(u,v).

In some embodiments of the present invention the magnitude of F(u,v) is determined from the square root of IF(u,v). The sign of F(u,v) can be determined by comparing IF(u,v) and IR(u,v) with IC(u,v). If IF(u,v) >IC(u,v) or IR(u,v) >IC(u,v) then R(u,v) and F(u,v) have opposite sign. Otherwise they have the same sign. Since the sign of R(u,v) is known the sign of F(u,v) is known.

Whereas, in FIGS. 3A and 3B reference image 60 is a symmetric image located at the center of origin of the (x,y) coordinates other reference images are possible and can be used in the practice of the present invention. For example, pixels 32 at the corners of spatial light modulator 30 can be used to generate useful reference images. In some embodiments of the present invention pixels 32 only in certain regions of spatial light modulator 30 are used to represent data. Pixels that are not needed for data are used, in some embodiments of the present invention, to generate reference images. In some embodiments, some data pixels are canceled or provided elsewhere n the image, for example as pixels in overlapping blocks. In other examples extra pixels are provided for the reference image, for example by inserting one or more rows or columns per block. For example "data" pixels may be restricted to alternate rows or columns of pixels. Or each data pixel may be surrounded by four pixels that are not used for data. In an exemplary embodiment, 9×9 blocks of data are used for an 8×8 block transform, with at least some of the extra pixels being used as a reference image. Alternatively or additionally, the effect of missing pixels may be corrected using an electronic or optical post processing step.

It should also be noted that dark pixels, pixels that are "turned off", that do not transmit light can function to generate reference images. For example, if an image on spatial light modulator 30 has bright pixels at the origin of coordinates (i.e. pixels 61, 62, 63 and 64 in FIG. 3B) a reference image can be generated by "turning off" the pixels. Turning off pixels in an image is of course equivalent to adding a reference image to the image for which light at the turned off pixels has a phase opposite to that of the light in the image.

In some embodiments of the present invention, reference image f(x,y) is chosen so that |R(u,v)|≧|F(u,v)| for all values of u and v for which R(u,v) and F(u,v) have opposite signs. For these embodiments of the present invention it is not necessary to determine IF(u,v) and only the operation shown in FIG. 3B in which IC(u,v) is measured is required to determine the magnitude and phase of F(u,v). If at a point (u,v), IC(u,v)−IR(u,v) >0 then the signs F(u,v) and R(u,v) are the same at the point otherwise the signs are opposite. The magnitude of F(u,v) at the point can be determined from IC(u,v) by solving the quadratic equation IC(u,v)=[|F(u,v)|²+|R(u,v)|²+2F(u,v)R(u,v)] for F(u,v).

Figure 4A:
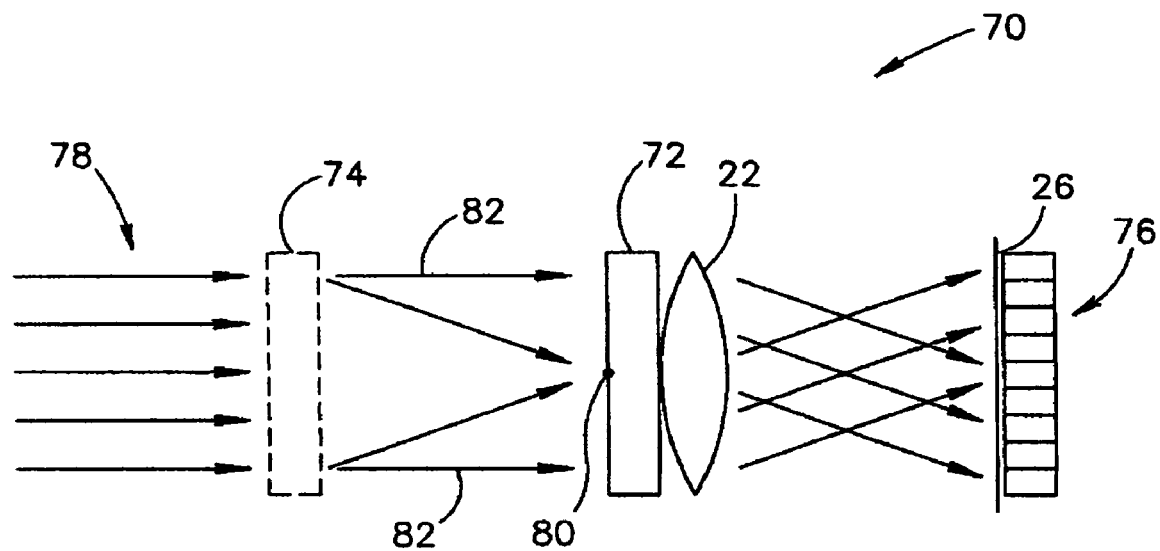
FIG. 4A schematically shows an optical processor that generates a reference image that is a delta function, in accordance with an embodiment of the present invention.

FIG. 4A schematically shows a side view of an optical processor 70, in accordance with an embodiment of the present invention, that generates a reference field for which |R(u,v)|>|F(u,v)| for all values of u and v for which R(u,v) and F(u,v) have opposite signs.

Optical processor 70 comprises a "Fourier" lens 22 having an output plane 26 coincident with a focal plane of lens 22, a spatial light modulator 72 and a "beam partitioner" 74. A detector array 76 is located at output plane 26 and measures intensity of light at the output plane. Spatial light modulator 72 defines an input plane for Fourier lens 22 and may be located at substantially any position to the left of output plane 26. In optical processor 70 spatial light modulator 72 is located by way of example adjacent to lens 22.

Beam partitioner 74 preferably receives an incident beam 78 of coherent collimated light generated by an appropriate source (not shown) and focuses a portion of the light to a point 80 and transmits a portion of the light as a transmitted beam of light 82 parallel to the incident beam. Light from transmitted beam 82 illuminates and is transmitted through spatial light modulator 72 and is focused by lens 22 to form a Fourier transform F(u,v) of a transmittance pattern f(x,y) formed on the spatial light modulator. It is assumed that the transmittance pattern has an appropriate symmetry so that the Fourier transform is a cosine transform of a desired image.

Point 80 functions substantially as a point source of light and provides a reference image r(x,y) for f(x,y) that is substantially a delta function $A\delta(x,y)$, where A is proportional to an intensity of light focused to point 80. A Fourier image, R(u,v), of light from point 80 is also formed on output plane 26 by lens 22. Since r(x,y) is substantially a delta function, R(u,v) is substantially constant and equal to A.

The magnitude of F(u,v) at a point (u,v) is of course proportional to the intensity of light in transmitted beam 82. In accordance with an embodiment of the present invention beam partitioner 74 is designed so that the relative portions of light focused to point 80 and transmitted in transmitted beam 82 beam are such that A=|R(u,v| is greater than |F(u,v)| for all values of u and v for which R(u,v) and F(u,v) have opposite signs.

Figure 4B:
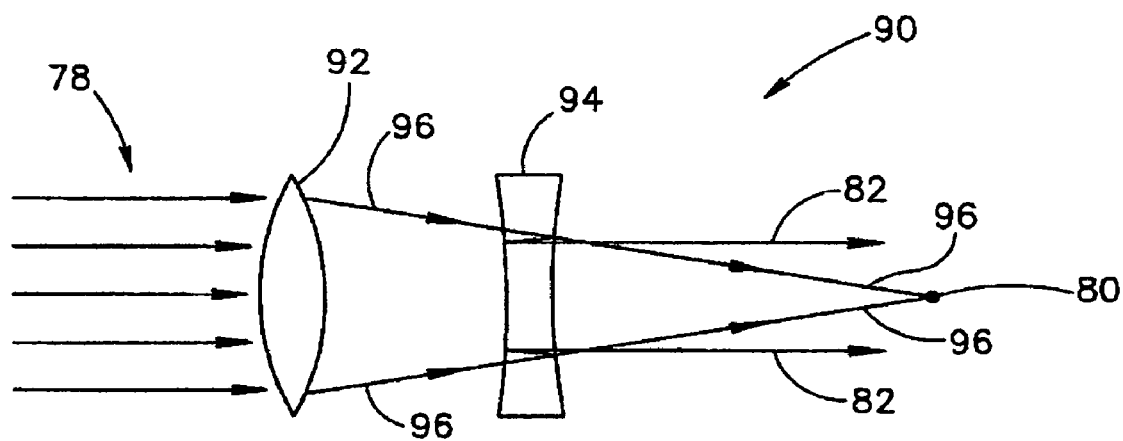
FIG. 4B schematically shows a lens system for generating a delta function reference image, in accordance with an embodiment of the present invention.

In some embodiments of the present invention beam partitioner 74 is a diffractive optical element such as a Fresnel zone plate having reduced efficiency. In some embodiments of the present invention, beam partitioner 74 comprises an optical system 90 of a type shown in a side view in FIG. 4B. Optical system 90 comprises a positive lens 92 and a weak negative lens 94. Positive lens 94 is preferably coated with an antireflective coating using methods known in the art to minimize reflections. Weak negative lens 92 is treated so that at its surfaces light is reflected with a reflectivity $\alpha$. Light from incident beam 78, represented by arrowed lines 96, that is transmitted through both positive lens 92 and negative lens 94 without reflections is focused to produce the point reference light source A.delta(x,y) at point 80. If the intensity of light in light beam 78 is "I" the amount of light focused to point 80 is substantially equal to $I(1-\alpha)^2$. Light that undergoes internal reflection twice in negative lens 94 is transmitted as transmitted beam of light 82 substantially parallel to incident beam 78. The amount of energy in transmitted beam 82 is substantially equal to $I(1-\alpha)^2\alpha^2$. The ratio of energy focused to point 80 to that contained in transmitted beam 78 is therefore equal to $I/\alpha^2$.

In accordance with an embodiment of the present invention R can be chosen so that A =|R(u,v| is greater than |F(u,v)| for all values of u and v for which R(u,v) and F(u,v) have opposite signs.

Given a function f(x,y) it can be shown that the cosine transform C.T.f(x,y)=1/2[ReF.T.{f(x,y)}+ReF.T.{f(x,-y)}]= 1/2[ReF$_p$(u,v)+ReF$_m$(u,v)] where Re indicates the real part of a complex number and F$_p$(u,v) and F$_m$(u,v) are the Fourier transforms of f(x,y) and f(x,-y) respectively.

Let c$_p$(x,y)=f(x,y)+A$_p\delta$(x,y) and c$_m$(x,y)=f(x,-y)+A$_m\delta$(x,y). The Fourier transform, C$_p$(u,v), of c$_p$(x,y) may be written C$_p$(u,v)=[F$_p$(u,v)+A]=[ReF$_p$(u,v)+Im F$_p$(u,v)+A$_p$], where Im indicates the imaginary part of a complex number and A$_p$ is assumed to be real. Similarly the Fourier transform of c$_m$(x,y) may be written C$_m$(u,v)=[F$_m$(u,v)+A$_m$]=[ReF$_m$(u,v)+Im F$_m$(u,v)+A$_m$].

If the "intensities" of the Fourier transforms F$_p$(u,v) and C$_p$(u,v) are written as IF$_p$(u,v) and IC$_p$(u,v) respectively so that IF$_p$(u,v)=|F$_p$(u,v)|$^2$ and IC$_p$(u,v)=|C$_p$(u,v)|$^2$ then it can be shown that ReF$_p$(u,v)=[IC$_p$(u,v)−IF$_p$(u,v)−A$_p^2$]/2A$_p$. Similarly, ReF$_m$(u,v) =[IC$_m$(u,v)−IF$_m$(u,v)−A$_m^2$]/2A$_m$ where IF$_m$(u,v)=|F$_m$(u,v)|$^2$ and IC$_m$(u,v)=|C$_m$(u,v)|$^2$.

Therefore the cosine transform of f(x,y) can be determined from the intensities IF$_p$(u,v), IC$_p$(u,v) and A$_p$ and IF$_m$(u,v), IC$_m$(u,v) and A$_m$. It should be noted that whereas a delta function has been added as a reference field for f(x,y) and f(x,-y) in the above calculations, similar results can obtain for other reference functions r(x,y). FIGS. 5A-5D illustrate a method, in accordance with an embodiment of the present invention by which the functions IF$_p$(u,v), IC$_p$(u,v) and A$_p$ and IF$_m$(u,v), IC$_m$(u,v) and A$_m$ are evaluated using an optical processor 100 to generate a cosine transform of a function f(x,y). Optical processor 100 is similar to optical processors 50 and 70 and comprises a Fourier lens 22, a photosensor array 52 at an output plane 26, which is located at a focal plane of lens 22 and a spatial light modulator 30.

Figure 5A:
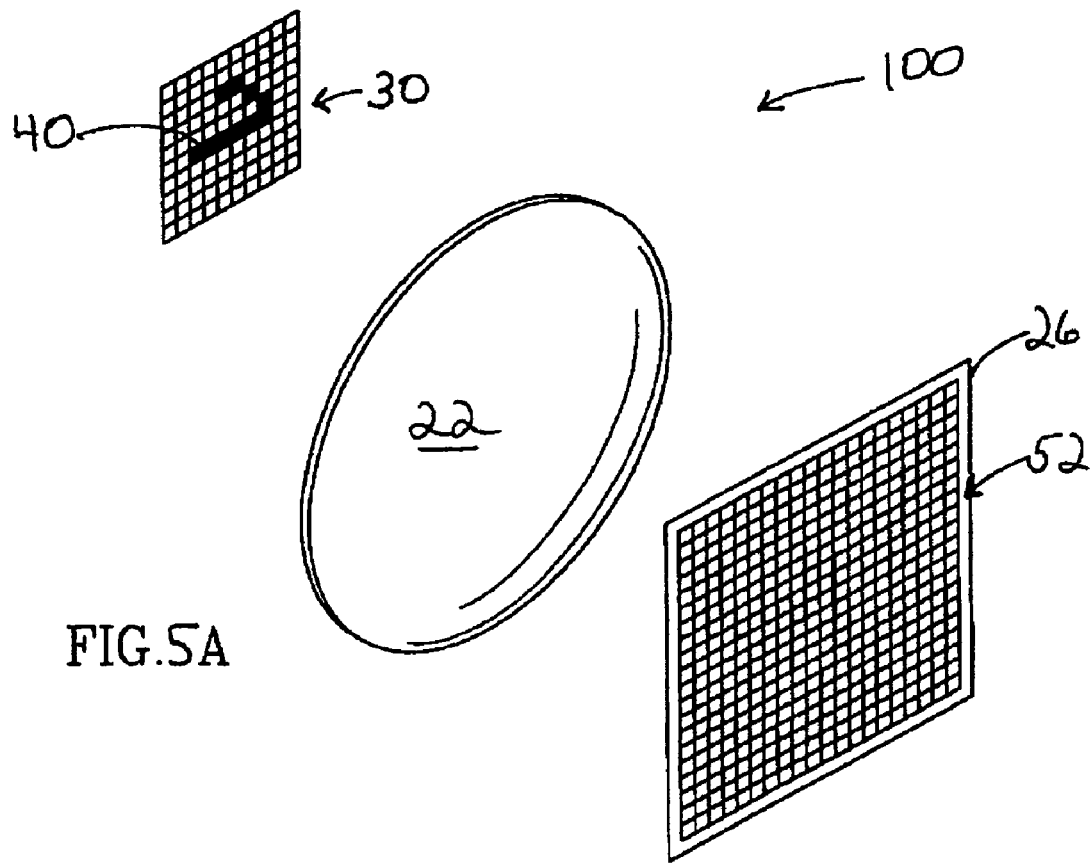
FIGS. 5A-5D schematically illustrate a method of generating a cosine transform of an image, in accordance with an embodiment of the present invention.
Figure 5B:
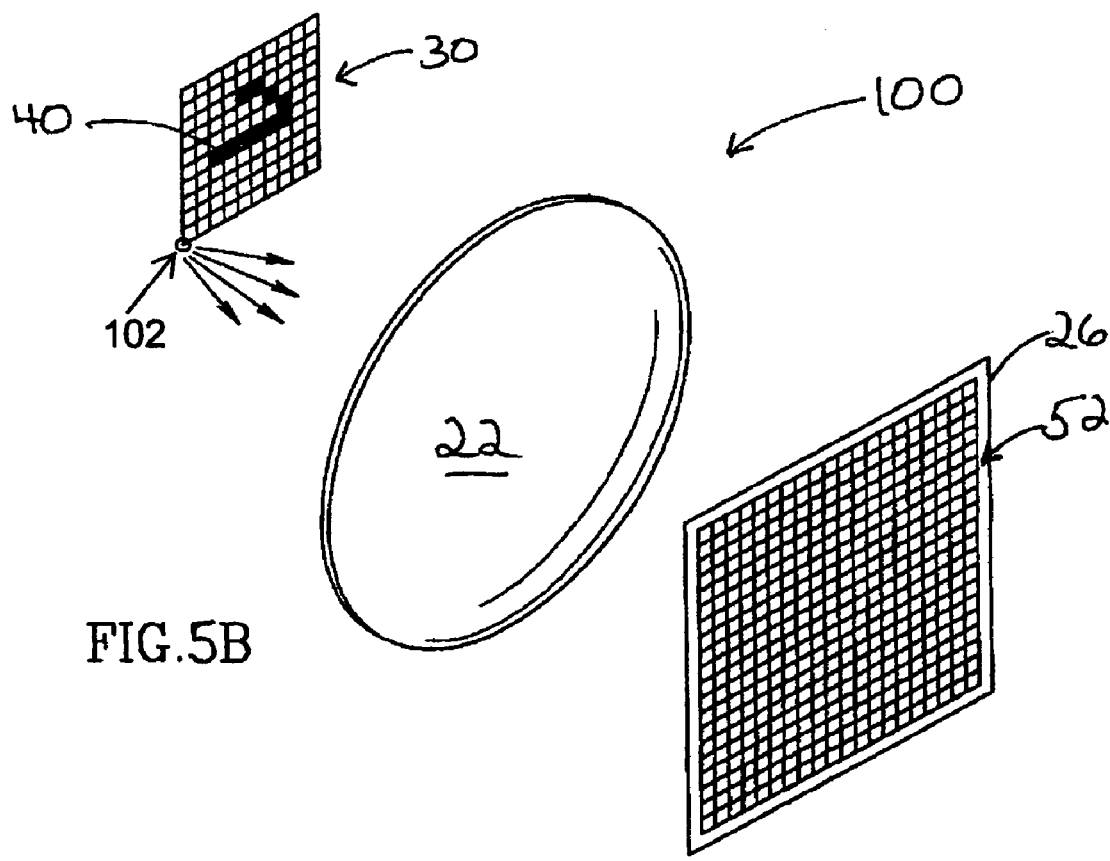

Referring to FIG. 5A assume that function f(x,y) is represented by an image 40 formed by spatial light modulator 30. Optical modulator 100 generates the Fourier transform F(u,v) of f(x,y) and acquires values for IF$_p$(u,v). In FIG. 5B, a point light source 102 generates a delta function reference A$_p\delta$(x,y) image which is added to f(x,y) to form an image c$_p$(x,y)=f(x, y) +A$_p\delta$(x,y). Processor 100 Fourier transforms c$_p$(x,y) and acquires IC$_p$(u,v). Point light source may be provided using any methods known in the art. In some embodiments of the present invention point light source is provided by methods and apparatus that are similar to those described in the discussion of FIGS. 4A and 4B.

Figure 5C:
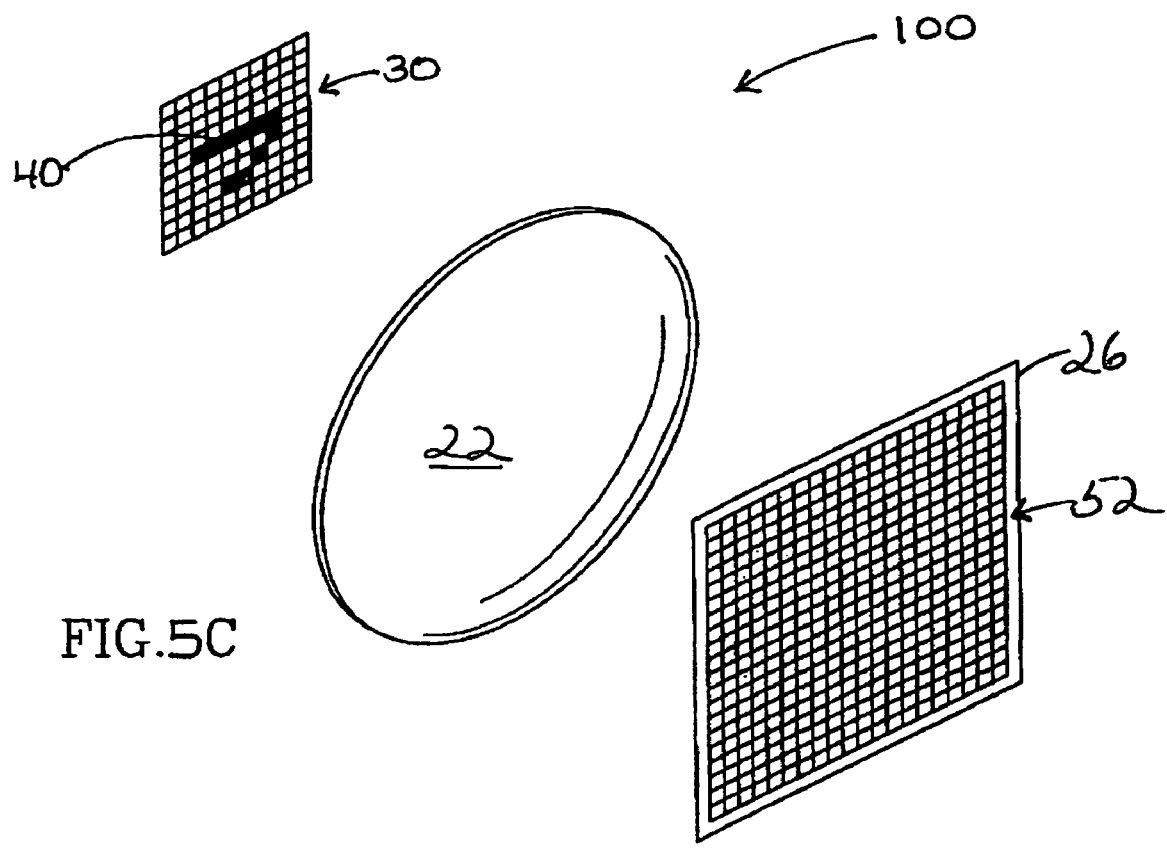
Figure 5D:
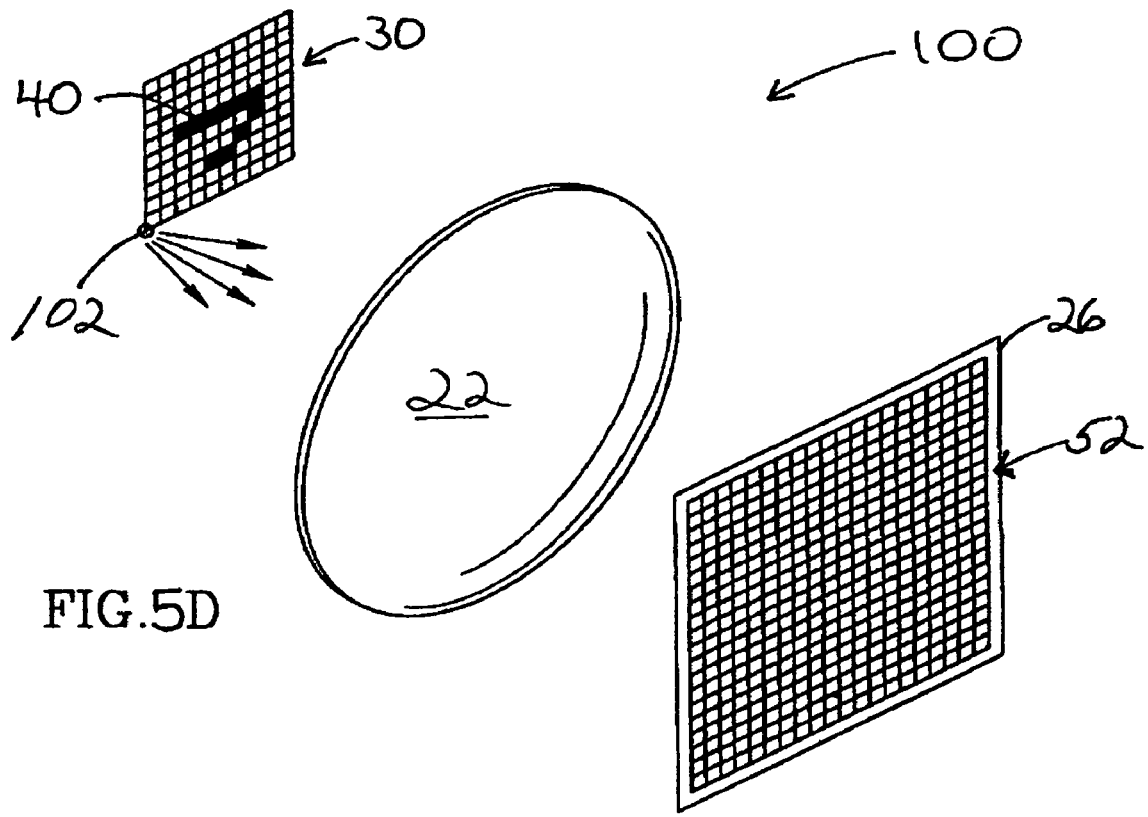

In FIG. 5C, spatial light modulator 30 forms an image f(x,-y) and acquires IF$_m$(u,v). In FIG. 5D a delta function reference function A$_m\delta$(x,y) is added to f(x,-y) and IC$_m$(u,v) is acquired. A suitable processor (not shown) receives the acquired data and uses it to determine ReF$_p$(u,v) and ReF$_m$(u,v) from which the cosine transform of f(x,y) may be determined as shown above.

The present application is related to the following four PCT applications, all filed on May 19, 2000: PCT/IL00/00282 published as WO 00/72105, which especially describes matching of discrete and continuous optical elements, PCT/IL00/00285 published as WO 00/72107 which especially describes reflective and incoherent optical processor designs, PCT/IL00/00283 published as WO 00/72104 which especially describes various architectures for non-imaging or diffractive based optical processing, and PCT/IL00/00286 published as WO 00/72108 which especially describes a method of processing by separating a data set into bit-planes and/or using feedback. The disclosures of all of these applications are incorporated herein by reference.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method of optical data processing, comprising:
   providing a first data set to be optically transformed using a transform;
   combining a reference data set with said first data set to generate coherent light, encoded with a combined data set;
   optically and coherently transforming said light that is encoded with the combined data set, into coherent light that is encoded with a transformed combined data set;
   obtaining a transformed reference data set by determining the effect said optical transform has on light encoded with said reference data set; and
   extracting a second data set that represents a transform of said first data set, from an intensity portion of light encoded with said transformed combined data set, using said transformed reference data set to extract a phase of at least one element of said second data set.

2. A method according to claim 1, wherein said transformed combined data set is detected using a power detector.

3. A method according to claim 1, wherein said transformed combined data set is encoded using incoherent light, after said coherent transforming.

4. A method according to claim 1, wherein said transformed combined data set is a discrete data set.

5. A method according to claim 1, wherein said first data set comprises a one-dimensional data set.

6. A method according to claim 1, wherein said first data set comprises a two-dimensional data set.

7. A method according to claim 6, wherein said first data set comprises an image.

8. A method according to claim 1, wherein said first data set comprises at least one positive value.

9. A method according to claim 1, wherein said first data set comprises at least one negative value.

10. A method according to claim 1, wherein said first data set comprises at least one complex value.

11. A method according to claim 1, wherein extracting comprises extracting using electronic processing.

12. A method according to claim 1, wherein combining a reference data set comprises adding at least one additional value to an existing element of said first data set.

13. A method according to claim 1, wherein combining a reference data set comprises replacing at least one existing element of said first data set with an element from a second data set.

14. A method according to claim 13, comprising compensating for an effect of said replaced value after said extraction.

15. A method according to claim 14, wherein said compensating comprises compensating using electronic processing.

16. A method according to claim 1, wherein combining a reference data set comprises adding at least one additional value alongside existing elements of said first data set.

17. A method according to claim 16, wherein said at least one additional value is arranged at a corner of a matrix layout of said first data set.

18. A method according to claim 1, comprising selecting said reference image to create a desired offset in said transformed combined data set.

19. A method according to claim 18, wherein said selecting takes into account system imperfections.

20. A method according to claim 18, wherein said offset is substantially uniform.

* * * * *